United States Patent [19]
Doerr et al.

[11] Patent Number: 5,658,648
[45] Date of Patent: Aug. 19, 1997

[54] LABELS FOR ELECTRICAL CORD SETS

[75] Inventors: Christopher Eugene Doerr, Indianapolis, Ind.; Daniel Richard Ray; Jodi Leigh Swoboda, both of Algoma, Wis.

[73] Assignee: Wisconsin Label Corporation, Algoma, Wis.

[21] Appl. No.: 518,195

[22] Filed: Aug. 23, 1995

[51] Int. Cl.⁶ .................................................. B32B 3/00
[52] U.S. Cl. ........................ 428/195; 428/204; 428/212; 428/411.1; 428/488.4; 428/500; 428/515
[58] Field of Search ........................ 428/195, 203, 428/204, 192, 913, 914, 212, 411.1, 488.4, 500, 515; 283/81, 18

[56] References Cited

U.S. PATENT DOCUMENTS

| | | |
|---|---|---|
| 4,465,717 | 8/1984 | Crofts et al. . |
| 4,557,971 | 12/1985 | Williams . |
| 4,584,238 | 4/1986 | Gen et al. . |
| 4,609,208 | 9/1986 | Wrobel . |
| 4,882,116 | 11/1989 | McMillen et al. . |
| 5,154,956 | 10/1992 | Fradrich . |
| 5,273,798 | 12/1993 | Miner . |
| 5,292,566 | 3/1994 | Shacklett, III . |
| 5,366,251 | 11/1994 | Brandt et al. . |
| 5,374,130 | 12/1994 | Hirono . |

Primary Examiner—William Krynski
Attorney, Agent, or Firm—Locke Reynolds

[57] ABSTRACT

Pressure-sensitive adhesive labels are disclosed, as might be particularly useful for application with electrical cord sets. The label is utilized to provide long-term, cautionary information regarding the dangers associated with electrical cord sets. The surface area of the label exceeds the circumference of the cord set, thereby allowing the label to wrap about the circumference of the cord set and adhere to itself, while also securely attaching to the cord set. The label comprises a primary adhesive which features a high shear adhesion property. A paper liner is removed from the primary adhesive prior to application to the cord set. The primary adhesive is provided on a bottom surface of a facestock, which has a high tensile strength and is preferably formed substantially from a vinyl material. Preferably, the facestock is provided with plasticizers and is topcoated. Printing ink displays a cautionary message on the topcoated upper surface of the facestock. A transparent overlaminate film, preferably formed from polypropylene, overlies the printed facestock. The overlaminate film is attached to the uppermost surface of the label by a transparent overlaminate adhesive. The labels of the present invention are able to withstand various harsh environmental conditions, and are therefore able to resist "wear and tear" which is encountered, often even upon outdoor use.

21 Claims, 3 Drawing Sheets

LABELS FOR ELECTRICAL CORD SETS

BACKGROUND OF THE INVENTION

The present invention relates generally to pressure-sensitive adhesive labels, as might be particularly useful for application with electrical cord sets.

The electrical cord industry continues to suffer from an excessive number of deaths and serious injuries to consumers caused by electrical shock. Accordingly, manufacturers of electrical cords, particularly cord sets, have sought to caution consumers of the various dangers that exist when electrical cords are not used properly. Electrical cord sets are particularly susceptible to causing injury or death due to electrical shock. For example, if a male end of a cord set is inserted into a power source, a dangerous situation exists unless a female end of the cord set is also appropriately connected, for example, to a power supply cord which is hard-wired into a device such as a computer.

Manufacturers typically warn consumers of many of the various hazards caused by improper use of electrical cord sets on the outer or prime packaging of the electrical cord set or associated product. Unfortunately, the warnings included with the packaging have been largely unsuccessful in increasing safety inasmuch as consumers may ordinarily discard the packaging prior to initial use of the electrical cord set. Therefore, any communications provided with the packaging are ill-suited for reminding consumers of potential dangers upon subsequent use. The problem is exacerbated when the communications are provided on an inside surface of the packaging because the warnings may actually go entirely unnoticed by the consumer.

Prior approaches for providing a long-term source for conveying cautionary information regarding electrical cord sets have heretofore been unreliable and ineffective. Because the outer insulation jackets of electrical cord sets are composed of materials which have a relatively low surface energy, such as rubbers or thermoplastics, securely attaching, or "flagging", labels to cord sets is difficult. In addition, upon flagging, a teardrop gap is ordinarily formed which undesirably causes air to desiccate the label, thereby ultimately deteriorating the label's ability to remain fastened to the cord set.

Labels taught in the prior art have been simply unable to withstand the "wear and tear" that is typically associated with the use of electrical cord sets, particularly during outdoor use. In this regard, the Underwriters Laboratories Incorporated has adopted Standard 817 for Safety of Cord Sets and Power Supply Cords. In accordance with Standard 817, labels that are attached to electrical cord sets must be able to withstand harsh exposure to heat, humidity, water immersion, freezing temperatures, pulling or snagging, ultraviolet light and other conditions. Following exposure to such severe conditions, Standard 817 of the Underwriters Laboratories Incorporated requires that the label be able to hold a 5 pound ($\approx$2.286 kg) weight without slipping from an original position on the cord by more than 0.5 inches ($\approx$1.28 cm), nor should the label tear or crack more than 0.06 inches ($\approx$0.16 cm). In fact, no adhesive label for cord sets has heretofore been able to satisfy the Underwriters Laboratories Standard 817.

From the foregoing, it will be appreciated that there exists a need in the art for an adhesive label which is able to withstand exposure to rigorous environmental conditions, as particularly encountered during use with electrical cord sets. In addition, a need also exists in the art for an adhesive label with these characteristics which does not utilize a self-winding construction during storage. A self-winding construction creates a dilemma because the label must be capable of readily delaminating from the self-winding construction during unwinding while also being able to securely fasten to an intended-use surface.

SUMMARY OF THE INVENTION

The aforesaid problems are solved, in accordance with the present invention, by a label that is particularly suited for application on electrical cord sets. The label is dimensioned so as to be able to wrap around the circumference of the electrical cord set and adhere to itself, thereby securely attaching to the cord set. The label comprises a paper release liner, as perhaps a kraft paper liner, which is removed from the remainder of the label prior to attachment of the label to the cord set. Upon removal of the paper liner, a primary adhesive is exposed and is utilized to securely attach the label to itself and to the cord set. The primary adhesive is a pressure-sensitive, permanent, adhesive, which is suitably "aggressive", as defined hereinbelow. The adhesive preferably can be solvent-based and can preferably be acrylic.

The permanent adhesive is positioned on a first surface of a facestock, which is preferably a flexible or semi-flexible vinyl. The facestock provides a surface for receiving and retaining printed matter in the form of at least one printing ink. Accordingly, a second surface of the facestock is preferably provided with an ink receptive topcoat which enhances ink receptivity or anchorage. The facestook is also provided with plasticizers which enhance the conformability of the facestock to contoured surfaces and also enhance the softness of the facestock.

The printing ink is utilized to convey a message, for example a cautionary message to consumers, and is provided on the topcoated second surface of the facestock. The printing ink is preferably a lightfast flexographic ink which is resistant to exposure to ultraviolet light. Water-based inks are preferred over solvent-based inks because the former are relatively nontoxic to the environment whereas the latter require expensive federally mandated safeguards during use.

A transparent, permanent overlaminate adhesive is provided over the underlying ink on the topcoated second surface of the facestock. The overlaminate adhesive is resistant to ultraviolet light and is utilized to attach a transparent overlaminate film onto an outermost surface of the label. The transparent overlaminate film is preferably comprised of polypropylene, but could alternatively be composed of other transparent materials such as polyethylene or polyester.

The labels of the present invention are advantageously able to provide long-term cautionary information to consumers, thereby facilitating a decrease in the number of serious injuries and deaths attributed to electrical shock. The labels of the present invention are relatively inexpensive to produce, yet are able to satisfy the requirements necessary for approval by the Underwriters Laboratories' Standard 817. In particular, the labels of the present invention have passed tests which are set forth in Standard 817, as described in more detail in the Examples hereinbelow, which suggest that the labels are able to withstand significant long-term "wear and tear" by consumers and still remain legible and fastened to the electrical cord set to which the label is originally attached. The labels of the present invention are able to withstand various deleterious environmental conditions and are often appropriate for outdoor use.

In addition, the labels of the present invention are advantageously able to adhere to a diverse range of electrical cord set insulation sizes and types, which are typically low surface energy materials. Preparation of the labels of the present invention is relatively easy and may be accomplished relatively quickly by virtue of the labels' ability to be dispensed easily and quickly, thereby preventing a slowdown in speed of production. The labels of the present invention provide for long-term adhesion, even upon exposure to a broad range of harsh environmental conditions.

The present invention will be more fully understood upon reading the following detailed description of the preferred embodiment in conjunction with the accompanying drawings.

DETAILED DESCRIPTION OF THE PREFERRED EMBODIMENT(S)

The following portion of the specification, taken in conjunction with the drawings, sets forth the preferred embodiment of the present invention. The embodiment of the invention disclosed herein is the best mode contemplated by the inventors for carrying out their invention in a commercial environment, although it should be understood that various modifications can be accomplished within the parameters of the present invention.

Figure 1:
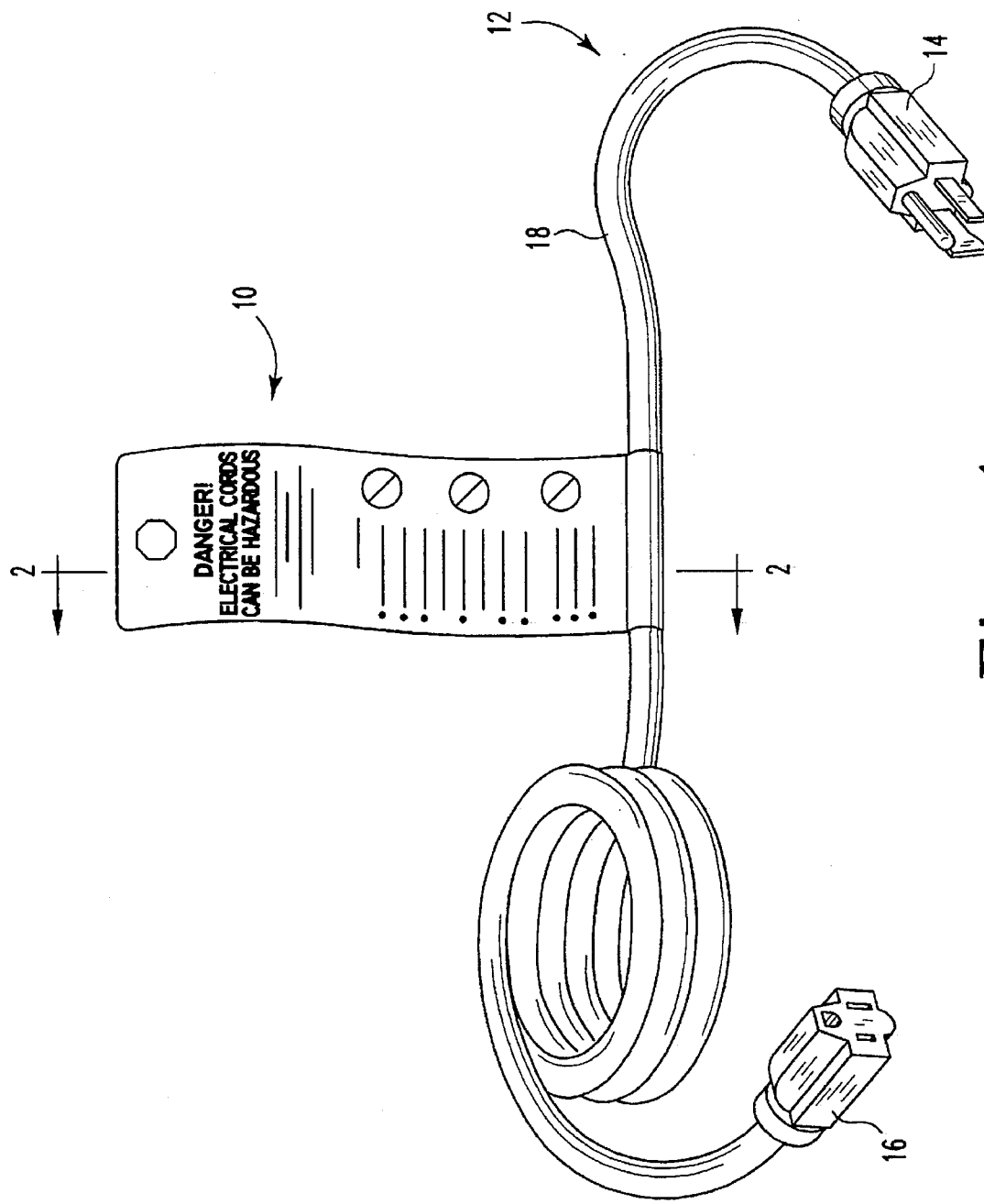
FIG. 1 illustrates a perspective view of a label as attached to an electrical cord set, in accordance with the present invention.
Figure 2:
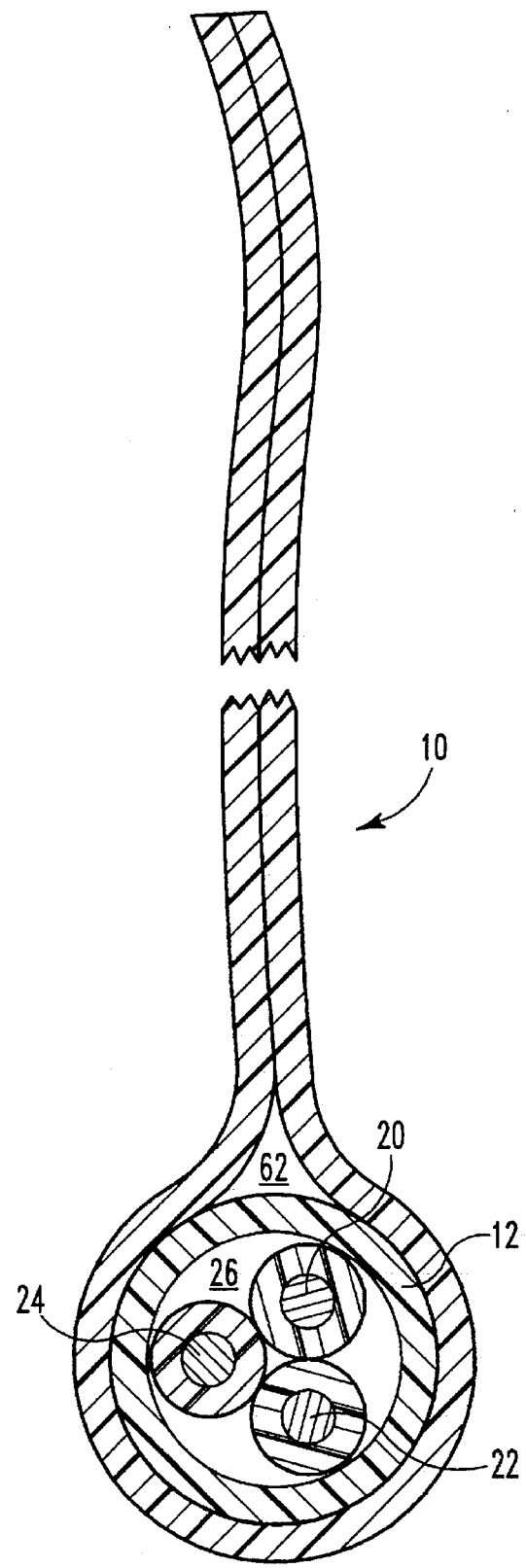
FIG. 2 illustrates an enlarged cross-sectional view of the label/electrical cord set assembly shown in FIG. 1, taken along the line 2—2, representing the present invention.

Referring to FIGS. 1–2, a pressure-sensitive permanent adhesive label 10, in accordance with the present invention, is shown as applied to an electrical cord set 12. The electrical cord set 12 generally comprises a male end 14 and a female end 16. As best seen in FIG. 2, the cord set 12 has an outer insulation jacket 18, which is commonly formed of a thermoplastic or rubber material. The interior portion of the cord set 12 may typically comprise two or three (as shown) conductors 20, 22 and 24, as well as filler material 26. The label 10 has a surface area which is greater in size than a circumference of the cord set 12. The adhesive label 10 is therefore large enough to wrap around the cord set 12 and adhere to itself in order to attach the label 10 to the cord set 12. It is noted that the labels 10 of the present invention are capable of application to cord sets 12 having a broad range of circumferences.

Figure 3:
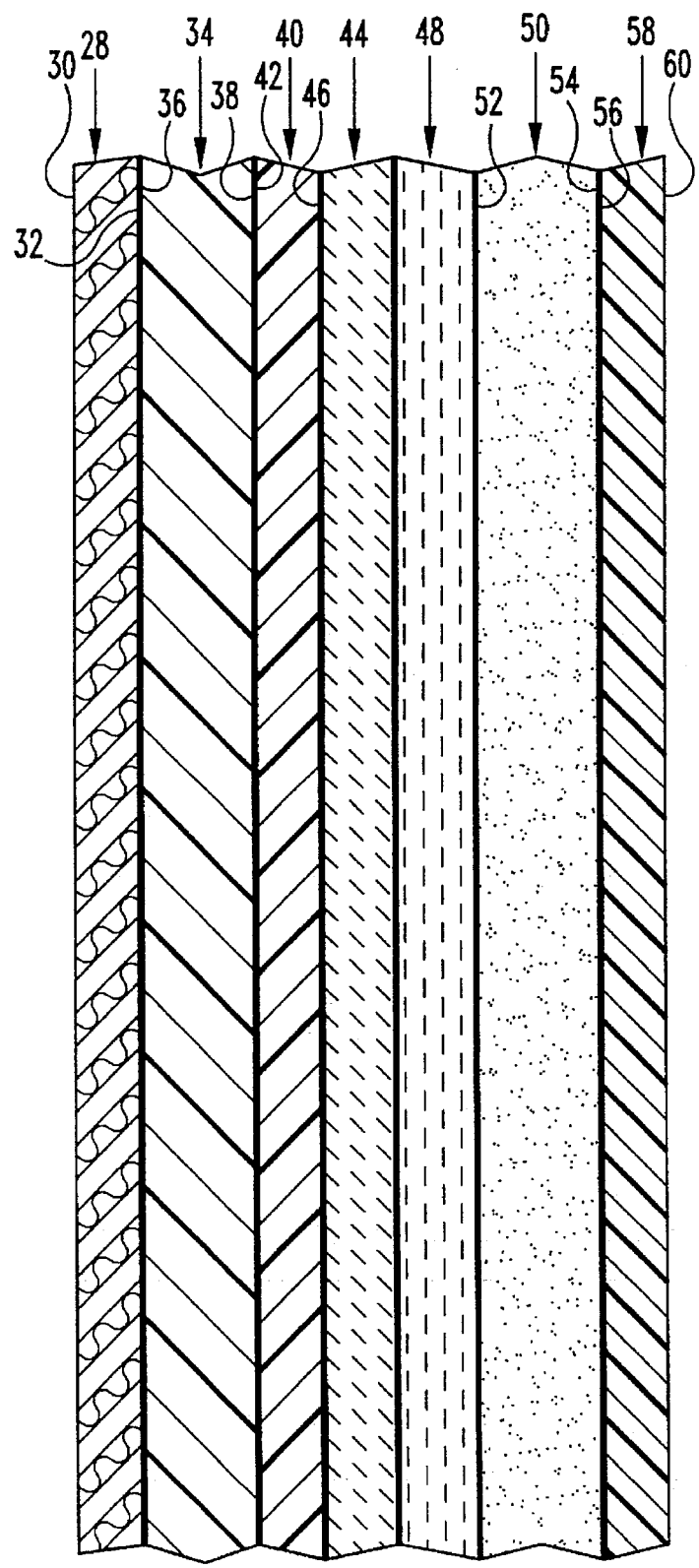
FIG. 3 schematically depicts a cross-sectional view of the layers of the label, in accordance with the present invention.

Referring now to FIG. 3, the components of the label 10 are schematically shown prior to application to the cord set 12, in accordance with the present invention. The adhesive label 10 comprises a paper release liner sheet 28 which in turn comprises a first surface 30, which defines an innermost surface for the label 10. The paper liner 28 also comprises a second surface 32, which is provided with a release coating (not shown) such as a silicone release coating. A permanent, pressure-sensitive acrylic primary adhesive 34 has a first surface 36 which is disposed in releaseable contact with the second surface 32 of the paper liner 28. The primary adhesive 34 also comprises a second surface 38 which is permanently attached to a facestock 40. The facestock 40 is preferably formed from a vinyl material. A first surface 42 of the facestock 40 is in permanent communication with the second surface 38 of the primary adhesive 34. An ink-receptive topcoat 44 is disposed on a second surface 46 of facestock 40. Printing ink 48 is applied to the ink-receptive topcoat 44 of the facestock 40 in order to provide a message. An ultraviolet-light resistant, transparent acrylic overlaminate permanent adhesive 50 comprises a first surface 52 which communicates with the topcoated printed second surface 46 of the facestock 40. The overlaminate adhesive 50 further comprises a second surface 54 which is attached to a first surface 56 of a transparent, biaxially oriented overlaminate film 58. A second surface 60 of the overlaminate film 58 defines an outermost surface of the label 10.

The paper liner 28 serves as a carrier vehicle for the label 10. Inclusion of the paper liner 28 is preferred over an alternative self-winding construction for the label 10. More specifically, the paper liner 28 advantageously minimizes a need for coatings, which are essential to the self-winding construction. In addition, the paper liner 28 also advantageously serves as a moisture barrier to the primary adhesive 34 during storage.

The paper liner 28 can preferably comprise a kraft paper liner, which may be a liner which ranges from about a 40 pound semi-bleached kraft paper liner to a 60 pound semi-bleached kraft paper liner. As noted above, the paper liner 28 is provided with a release coating, for example, a silicone release coating. The release coating is included to facilitate the removal of the liner 28 from the pressure-sensitive acrylic primary adhesive 34 prior to application of the label 10 to the cord set 12, as described in more detail hereinbelow. Following removal of paper liner 28, the first surface 36 of the primary adhesive 34 becomes the innermost surface of the label 10.

Accordingly, the relative ease with which the liner material 28 is separated from the primary adhesive 34, or release tension, is critical in selecting the release coating. By way of example, release coatings which are composed substantially of silicone are effective in separating the primary adhesive 34 from a paper liner 28 which is formed of a kraft paper. During and after separation of the paper liner 28 from the primary adhesive 34, the vast majority of the release coating remains on the second surface 32 of the separated liner 28.

The pressure-sensitive, permanent acrylic primary adhesive 34 has flow characteristics which are conducive to allowing the label 10 to be easily adhered to low surface energy insulation jackets 18 of the cord set 12. One of ordinary skill in the art will appreciate that cord sets 12 generally have insulation jackets which are most commonly composed of the following rubber or thermoplastic materials which have a relatively low surface energy: SJE, SVE, SE, SJT, ST, SVT, SJTW-A, STW-A, SJEW-A, SEW-A, SPT-1, SPT-2, and SPT-3, or as otherwise identified by the National Electrical Manufacturers Association (NEMA). It is noted that, generally, labels are more difficult to adhere to the aforesaid relatively low surface energy materials, as opposed to materials which have a higher surface energy, such as aluminum or steel.

The primary adhesive 34 of the present invention can preferably be solvent or solution based and has high bond and plasticizer resistance characteristics. It is noted that, generally, the insulation jackets 18 found on electrical cord sets 12 often include plasticizers. The primary adhesive 34 is plasticizer-resistant so that the plasticizers from the insulation 18 of the cord set 12 do not interfere with the primary adhesive 34 during long-term adhesion.

Critically, the primary adhesive 34 has a high shear adhesion property. Accordingly, an "aggressive" adhesive, which is also resistant to harsh environmental conditions, is selected as the primary adhesive 34. As defined in the present invention, an "aggressive" adhesive has high shear adhesion, thereby imposing a relatively high force requirement for pulling the label 10 from a surface to which it is affixed. The high shear adhesion is commonly measured as the amount of time required for a one square inch sample to slip down or off of a surface having a high surface energy when pulled by a specific amount of weight. Under one definition of the high shear adhesion of the present invention, in accordance with Pressure Sensitive Test Council (PSTC) test number 7, a high shear adhesion requires at least approximately 15 hours for the adhesive to slip from a 50 micron polyester film which has a surface area of 1 square inch (6.45 square cm) by a force of 700N/m$^2$ at 21° C. ($\approx$70° F.) when the adhesive has a thickness of approximately 25 microns (1 mill. The time results will vary as the other parameters vary. For instance, the amount of time will be shorter if a sample adhesive has a lower thickness. Under an alternative test, in accordance with ASTM D-3654, the high shear adhesion is defined as requiring at least 20 minutes for a 1 inch ($\approx$2.54 cm) by 0.5 ($\approx$1.28 cm) inch sample of adhesive to slip from a stainless steel panel by a weight of 1000 grams. It is noted that these dimensions and parameters are merely for testing purposes inasmuch as the labels of the present invention may comprise a variety of configurations and dimensions.

The aggressive primary adhesive 34 of the present invention can preferably also possess the following properties: high initial tack, high ultimate adhesion, and high peel adhesion. The high initial tack feature of the primary adhesive 34 allows the label 10 to grasp the cord set 12 with a minimal amount of pressure. The high ultimate adhesion property of the primary adhesive 34 is beneficial because the label 10 is very difficult to remove 72-96 hours following fastening to the cord set 12. Because of the high peel adhesion feature of the primary adhesive 34, a great amount of force is required to remove the label 10 material. Generally, peel adhesion is commonly measured by removing a strip of the label 10 from a stainless steel surface at a fixed rate of removal from a point which is either 90 degrees or 180 degrees from the surface of the label 10. In addition, the aggressive primary adhesive 34 also resists adhesion problems caused by exposure to harsh conditions, such as high humidity, high and low temperatures, water immersion and ultraviolet light.

The primary adhesive 34 is also provided with antioxidants, which are added to prevent the primary adhesive 34 from drying out, which would otherwise act to diminish the ability of the primary adhesive 34 to maintain adherence to the cord set 12. As shown in FIG. 2, a teardrop gap 62 is typically formed upon flagging of the label 10 to the cord set 12. The teardrop gap 62 is undesirable inasmuch as air is then able to penetrate and somewhat desiccate the primary adhesive 34 of the label 10. The anti-oxidants are therefore included to preclude the primary adhesive 34 from drying out. Resins or tackifiers are also added to the primary adhesive 34 in order to enhance the ability of the label 10 to attach to the cord set 12 with a minimum of pressure.

Many suitable aggressive adhesives are available. For instance, Fasson Corporation of Painesville, Ohio, produces aggressive adhesives such as the following adhesives which are identified as: S-277, S-333, S-730, S-1000, S-3000, S-4600, and S-4900. In addition, 3M Co. of St. Paul, Minn. produces aggressive adhesives such as the following adhesives which are identified in: 3M 8418 and 3M 8417. Further, Brady Company of Milwaukee, Wis. produces aggressive adhesives such as the following adhesives which are found in constructions identified as: B-652, B-632, B-637, B-917, B-969, and B-999. Similar aggressive adhesives are readily available from other sources.

The facestock 40 is formed of a printable material inasmuch as the facestock 40 provides a surface for receiving and retaining the ink 48 which conveys a message to, for example, a consumer. The facestock 40 is also selected based upon tensile strength and elongation characteristics. For clarity of description, "tensile strength" relates to a force parallel to a plane of the specimen required to break a given width and length of stock under specified conditions. As defined in the present invention, the tensile strength values provided hereinbelow are based in accordance with ASTM D-882, on tests of a sample with dimensions of 1 inch ($\approx$2.56 cm) by 5 inches ($\approx$12.8 cm), unless noted otherwise. It is noted that these dimensions are for testing purposes only, inasmuch as the labels of the present invention may comprise a variety of dimensions and configurations. Further, "elongation" relates to the distance a material will stretch lengthwise before breaking, and is expressed as a percentage of original length. It is noted that elongation is not necessarily an indication of conformability. Tensile strength and elongation can be measured in both a machine direction and a transverse direction.

More specifically, the facestock 40 has a high tensile strength which is defined as exceeding either or both of the following thresholds when tested in the machine direction and/or the transverse direction. For purposes of the present invention, the "high" tensile strength is defined as exceeding about 3000 pounds per square inch (psi) when tested in the machine direction, and most typically ranges from about 3200 psi to about 4450 psi when tested in the machine direction. In the transverse direction, the facestock 40 preferably has a high tensile strength which is defined as exceeding about 2200 psi, and most typically ranges from about 2400 psi to about 4250 psi. In addition, the facestock 40 preferably has an elongation which exceeds 120% when tested in the machine direction and preferably exceeds 125% when tested in the transverse direction.

Further, the facestock 40 preferably has good conformability to contoured surfaces, that is, low memory, as well as relative stiffness or rigidity. One of ordinary skill in the art will appreciate that stiffness is typically described in a unit measure provided in gram-centimeters, as in the "Tabor" testing method. More particularly, stiffness can be described as the bending moment, in gram-centimeters, required to deflect a sample having a width of 1.5 inches ($\approx$3.89 cm) by 15° from the sample's original position when a Icad is approximately 2 inches ($\approx$5.13 cm) away from a clamp. These dimensions and parameters are merely for testing purposes, inasmuch as the labels of the present invention may comprise a variety of configurations and dimensions. Preferably, the facestock 40 has a stiffness which ranges from about 0.18 gram-centimeters to about 1.75 gram-centimeters when tested in the machine direction. Facestocks 40 having a stiffness ranging from 0.18 gram-centimeters to 1.75 gram-centimeters when tested in the machine direction are typically conformable, but are also suitably stiff for inclusion in the labels 10 of the present invention. Most preferably, the facestock 40 has a stiffness which ranges from about 0.20 gram-centimeters to about 0.40 gram-centimeters when measured in the machine direction. The facestock 40 is also resistant to wrinkling, delamination, high humidity, both high and low temperatures, water immersion, ultraviolet light, and other adverse environmental conditions.

Flexible or semi-flexible vinyls, such as a polyvinyl chloride, vinyl acetate, ethylene vinyl acetate, polyvinyl fluoride, vinyldiene chloride copolymer or a vinyl chloride acetate copolymer, are preferred materials for the facestock 40. Vinyls are particularly advantageous because they are not cost prohibitive, and they are resistant to shrinkage, ultraviolet light, and harsh environmental conditions. In particular, vinyls have good conformability and provide a good balance between softness, or drape characteristics, and rigidity or stiffness. Vinyls are also able to withstand some degree of cold cracking.

However, other materials producing the appropriate elongation and tensile strength, and preferably containing appropriate stiffness and conformability characteristics, may be utilized as the facestock 40, as perhaps polyester, latex impregnated vinyl, polystyrene, polyolefin, spunbounded polyolefin, acetate, polyethylene, vinyl cloth, polycarbonate, acrylonitrile-butadiene-styrene (ABS), cellulose triacetate, ethylene-chlorotrifluroethylene copolymer (ECTFE), ethylene-tetrafluroethylene copolymer (ETFE), polyamides such as nylon 11 or nylon 12, fiber reinforced polycarbonate, polyethylene terephthalate (PET), ethylene vinyl acetate copolymer, biaxially oriented polypropylene, polyurethane, or more likely, combinations of these materials or combinations of these materials with latex. It is noted that although most of these materials may not inherently possess the appropriate tensile strength, elongation or stiffness, these materials may be adapted to possess the tensile strength, elongation, and stiffness characteristics of the present invention, for example by the use of additives such as plasticizers, as described hereinbelow, or through the use of fibers or other fillers, or by blending or copolymerizing the polymers.

The facestock 40 is preferably primarily provided with a white color. Accordingly, a whitening agent may be added to the facestock 40 as desired. Many well-known whitening agents are available, including but not limited to: titanium dioxide, zinc phosphate, zinc oxide, zinc sulfide and lithopone. For use with flexible and semi-flexible vinyls, preferred whitening agents include but are not limited to: titanium dioxide, zinc phosphate and lithopone. However, the facestock 40 may alternatively comprise other and/or additional colors.

In accordance with the present invention, the facestock 40 is provided with plasticizers which enhance the softness and conformability of the facestock 40. The plasticizer content must be high enough to enable the facestock 40 to resist tearing and enhance conformability. However, the plasticizer content must also be low enough so as to minimize the amount of label shrinkage that occurs upon exposure to a variety of temperatures. The concentration of plasticizers included on the facestock 40 varies according to the type of material utilized in the facestock 40. For example, a facestock 40 formed from a vinyl may contain a plasticizer content of approximately 14%–15% by weight of the facestock 40. The plasticizers are polymeric, and many are well known in the art. In addition, the plasticizers counteract the presence of pigments on the facestock 40. Pigments may act to harden the facestock 40, and the plasticizers allow the facestock to become more conformable, despite the presence of the pigments.

The ink-receptive topcoat 44 is not required but is preferably provided on the second surface 46 of the facestock 40. Print-receptive coatings are generally known in the art and will not be described in detail herein. The topcoat 44 may include at least one solid particulate in order to enhance ink receptivity. Topcoat 44 is selected so as to be compatible with the facestock 40. More particularly, the topcoat 44 must be able to stay bonded to the facestock 40 and not wash away. The topcoat 44 must also be compatible with the printing ink 48, for example, a water-based, flexographic ink.

The print-receptive topcoat 44 is provided as a full tint or flood coat on the facestock 40. The ink-receptive topcoat 44 covers the entire exposed surface of the facestock 40 on the printing surface, preferably a flexographic printing surface. The flood coating enhances the molecular bonding of the ink 48 to the facestock 40, while also attenuating the possibility of ink bleed and ink splash. To put it another way, the topcoat 44 extends or enhances ink receptivity, or ink anchorage.

The printing ink 48 is selected based upon its high bond values with respect to the topcoat chemistry of the facestock 40. Further, the printing ink 48 also should have good lightfast capabilities, despite exposure to ultraviolet light. In addition, the ink 48 should also be able to provide good ink coverage qualities so that the printed matter is easily legible. A preferred printing ink 48 is a lightfast flexographic water-based ink, such as Arcar Phase II lightfast ink, supplied by Arcar Graphics, Inc. of West Chicago, Ill.

Water-based inks are preferred because they are relatively nontoxic to the environment. In contradistinction, solvent-based inks are typically damaging to the environment in the absence of implementation of expensive EPA mandated safeguards. Flexographic inks are preferred over other inks including: letterpress, screen, gravure, offset, ink-jet, ion deposition, photocomposition, or any combination thereof. Black and/or red inks are preferred colors for conveying messages. Alternative ink colors may be selected, as desired, and are typically selected based upon compatibility with the color of the facestock 40.

The transparent overlaminate film 58 is affixed to the outermost portion of the label 10 by means of the ultraviolet-light resistant, transparent acrylic overlaminate permanent adhesive 50. Both the overlaminate adhesive 50 and overlaminate film 58 must be transparent in order to preclude concealment of the message and/or artwork provided in the form of the ink 48 disposed on the underlying facestock 40. Many different permanent adhesives are suitable as the overlaminate adhesive 50 of the present invention. The critical features necessary for suitable overlaminate adhesives 50 of the present invention are that the overlaminate adhesive 50 is permanent, ultraviolet-light resistant and transparent.

The biaxially-oriented overlaminate film 58 is provided in order to protect the other layers, particularly the facestock 40 and the ink 48, from damage or obliteration caused by abrasion, scratching, or incidental exposure to ultraviolet light. The overlaminate film 58 also provides additional resistance to ultraviolet light, while concomitantly providing additional strength for the label 10. The susceptibility of the label 10 to tearing or cold cracking is attenuated by the additional strength imparted to the label 10 by the overlaminate film 58. The overlaminate film 58 is preferably comprised of polypropylene because of the relatively inexpensive cost associated therewith. However, the overlaminate film 58 could also be composed of other transparent materials such as polyethylene or polyester. Although inclusion of the overlaminate film 58 is strongly preferred, the overlaminate film 58 is not necessary if the additional strength otherwise provided therefrom is already provided by the facestock 40.

Advantageously, the overlaminate film 58 permits the present invention to not require that the printing ink 48 be catalyzed prior to application to the topcoat 44 of the facestock 40. More specifically, the overlaminate film 58 protects the ink 48 and sufficiently anchors the ink 48 by minimizing ink bleed. However, the ink 48 may be catalyzed, if desired, particularly if the overlaminate film 58 is not included. Catalyzing the ink 48 enhances the molecular bonding of the ink 48 to the topcoat 44, thereby enhancing anchorage of the ink 48 on the facestock 40. The ink 48 may therefore be laid by means of an ink catalyzing process which increases the molecular attraction of the ink 48 to the topcoated facestock 40 thereby permitting maximum ink adherence. For example, the ink 48 may be catalyzed by the addition of a hardening agent, which not only facilitates anchorage of the ink 48, but also allows the ink 48 to become more resistant to harsh environmental conditions. An example of an appropriate catalyst is an "arcar catalyst", available from Arcar Graphics, Inc.

Turning now to the thickness of the label 10, the overall thickness of the label 10 may vary, but preferably ranges from about 0.0046 inches ($\approx$0.0113 cm) to about 0.00681 inches ($\approx$0.0175 cm), without the paper liner 28. In addition, the paper liner 28 may typically have a thickness which ranges from about 0.00225 inches ($\approx$0.00577 cm) to about 0.00341 inches ($\approx$0.00874 cm). With respect to the approximate thicknesses of other components of the label 10, the primary adhesive 34 ranges in thickness from about 0.0006 inches ($\approx$0.00154 cm) to about 0.0012 inches ($\approx$0.00308 cm). Importantly, the primary adhesive 34 must be sufficiently thick to enable the label 10 to be affixed to the cord set 12 with strong shear adhesion capability. The facestock 40 and topcoat 44 combine to preferably provide a thickness ranging from about 0.00315 inches ($\approx$0.00808 cm) to about 0.00418 inches ($\approx$0.0107 cm), Most preferably, the thickness of the facestock 40 alone ranges from about 0.00315 inches ($\approx$0.00807 cm) to about 0.00418 inches ($\approx$0.01718 cm). The overlaminate adhesive 50 and overlaminate film 58 combine to preferably provide a thickness which may range from about 0.0009 inches ($\approx$0.00231 cm) to about 0.00143 inches ($\approx$0.00367 cm). It is noted that the ink 48 is metered in order to provide solid coverage with minimal bleed and splash characteristics.

The dimensions of the label 10 are most preferably approximately 1.75 inches ($\approx$4.49 cm) by 10.0 inches ($\approx$25.6 cm) so as to substantially form a rectangular configuration. However, the dimensions of the label 10 may vary, as desired, with a mere limitation of supplying sufficient space for the printed matter. The label 10 may also be configured in alternative shapes, including but not limited to oval, triangular, or square shapes. Larger dimensions provide more surface area for contacting the cord set 12, but are more expensive to produce. The label 10 also preferably has a corner radius of 0.06 inches (0.16 cm) so as to form slightly rounded corners. Labels having more rounded corners are less desirable because they tend to create a need for increased space for the printed matter. Labels having more square corners are less desirable because they tend to curl.

In preparing the label, the first surface 42 of the facestock 40 is coated with the pressure-sensitive, permanent acrylic primary adhesive 34 and attached to the kraft paper liner 28 to form a master web. In the master web, the facestock 40 is also provided with the aforesaid plasticizer content and the topcoat 44. In roll form, this master web is loaded onto a core holder of a flexographic printing press. The material is then fed through a dancer bar beyond an edge guide and idler roll where at least one Arcar Phase II lightfast waterbased flexographic ink is applied by means of a photopolymeric printing plate mounted to a print cylinder. The ink 48 is transferred and metered to the photopolymeric printing plate by anilox and doctor roll cylinders. It is noted that the ink 48 is not required to be catalyzed prior to the application to the topcoat 44 of the facestock 40. The ink 48 is then dried to a level which provides for enhanced molecular bonding to the topcoat 44 as well as the elimination of ink bleed. After the ink dries, a self-wound, transparent, biaxially-oriented polypropylene overlaminate film 58 with pre-coated ultraviolet resistant acrylic overlaminate adhesive 50 is laminated to the master web having ink 48 applied thereon.

A precision tooled, electrical discharge machining processed rotary die is utilized to cut the label 10 into the aforesaid dimensions of 1.75 inches ($\approx$4.49 cm) by 10.0 inches ($\approx$25.6 cm), with a corner radius of 0.06 inches ($\approx$0.16 cm). The electrical discharge machining processed rotary die is important because it precludes tearing, poor or uneven cuts, or consequent dispensing problems such as web breaks, as might otherwise occur through use of alternative cutting methods. During the cutting process, a pinch roll is used to maintain appropriate tension on the master web. This tension is critical in eliminating web breaks which otherwise create difficulty in label 10 dispensing during production of cord sets 12. Strobe and calibration techniques are utilized to ensure consistency in the die-cutting, consistency in registration of the printed text and/or artwork 48, and absence of bubble formation created by air pockets between the overlaminate adhesive 50 and the topcoat 44 of the facestock 40.

In use, the label 10 may be applied to the cord set 12 either manually or semi-automatically. As noted hereinabove, prior to adhesion to the cord set 12, the paper liner 28 is removed from the label, thereby exposing the adhesive 34. Manual application may be facilitated by the use of a template on a flat surface. The template notes a longitudinal mid-point on the label 10. The cord set 12 is then placed on the mid-point, with the length of the cord set 12 positioned perpendicular to the longitudinal edge of the label 10. The label 10 is then folded in half, as defined by the mid-point, and wrapped around the cord set 12 so as to attach the exposed primary adhesive 34 to itself, with a minimum of hand manipulation in order to avoid contamination of the adhesive 34. Because the label 10 is folded about the cord set 12 in order to enable the primary adhesive 34 to attach to itself, the outer surface of the label 10 on either side of the cord set 12 is the outermost, overlaminated second surface 60 of the label 10. Therefore, printed matter 48 may be shown on both sides of the label 10 after attachment to cord set 12. A hard, flat instrument may be conducted over the overlaminated surface of the label 10 to minimize the presence of air bubbles or wrinkles and reduce the size of the teardrop gap 62 at the mid-point at which the label 10 meets the cord set 12.

During semi-automatic application, the use of a Wisconsin Label Group Wire, Cord, and Cable Label Applicator is recommended. The Wisconsin Label Group Wire, Cord, and Cable Label Applicator features inverted dispensing with the primary adhesive 34 facing upwardly. The label 10 is dispensed onto an air-assisted vacuum pad assembly. The cord set 12 is placed into a grooved starwheel that is rotated forward. This forward motion enables the cord set 12 to strike the mid-point of the label 10. The two halves of the label 10, as defined by the mid-point, are wiped together using foam rollers.

The present invention is illustrated by the following representative examples, followed by comparative examples which illustrate failed test results.

EXAMPLE 1

A topcoated white vinyl facestock supplied by Flexcon Company Inc. of Spencer, Mass., and identified as Flexcon 41185, is coated on its bottom surface with an aggressive, solvent-based, permanent acrylic primary adhesive. The primary adhesive is in turn attached to a 58 pound kraft paper liner, in order to form a master web. The facestock comprises plasticizers, which are present in a concentration of 14–15% by weight of the facestock. The elongation of the facestock is tested and found to be 120% ±40% when tested in the machine direction, and 200% ±50% when tested in the transverse, or cross direction. Further, the tensile strength of the facestock is tested and found to be 4100 pounds per square inch (psi) ±350 psi when tested in the machine direction and 3750 psi ∓500 psi when tested in the transverse direction. The thickness of the facestock prior to topcoating ranges from about 3.15 mils to about 3.85 mils.

A label is prepared as described hereinabove by applying water-based lightfast flexographic inks which are supplied by Arcar Graphics Inc., and identified as Arcar Phase II inks, in order to provide a cautionary message. A transparent, polypropylene overlaminate film supplied by Sekesui TA Industries, Inc. of Garden Grove, Calif. and identified as Sekesui TA 1205, is laminated onto an outermost surface of the label by an ultraviolet resistant acrylic adhesive. The label is applied to a cord set as described hereinabove. Three labels of this type are subjected to conditioning tests, in accordance with the Underwriters Laboratories Incorporated Standard 817 for Safety of Cord Sets and Power Supply Cords.

In each of the tests, as described below, the label is tested with a "5 pound test" to ensure that the label resists tearing beyond 0.06 inches (1.6 mm) at any point, that the label does not separate from the cord set, that the label does not slip or move along the length of the cord set more than 0.5 inches (13 mm) and there is no visible damage to the cord, that there is no permanent shrinkage, deformation, cracking, or other condition that renders the printed matter of the label illegible, and that the overlamination remains in place and is not otherwise torn or damaged.

The following "5 pound test" is the test referred to in each of tests 1–6 below. It is noted that each test is performed on a length of cord set to which the label is applied. Specifically, the cord set, with the attachment plug facing upwardly, is tautly held in a vertical plane. A force of 5 pounds (22.2N), including the weight of a clamp, is applied for 1 minute to an uppermost corner of the label furthest from the cord set, within 0.25 inches (6.4 mm) of the vertical edge of the label. The force is applied by affixing a C-clamp with a pad diameter of 0.375 inches (9.5 mm) to the label and securing the weight to the C-Clamp. The force is applied vertically downward in a direction parallel to the major axis of the cord set. To determine compliance with the test, the label may be straightened by hand, and each label is scraped 10 times vertically across printed areas and edges with a force of approximately 2 pounds (9N). The label is scraped using the edge of a 0.078 inch (2.0 mm) thick steel blade at a right angle to the test surface. The edges of the blade are just rounded so as not to be sharp.

In the first conditioning test, the three labels are conditioned for 240 hours in an air-circulating oven at a temperature which is approximately 140° F. ±1.8° F. (60° C. ±1.0° C.). The labels are then tested with the "5 pound test" after 30 minutes of conditioning at a temperature of approximately 73.4° F. ±3.6° F. (23.0° C. ±2.0° C.)

In the second conditioning test, the three labels are tested with the "5 pound test" within 1 minute following exposure to a relative humidity of 85±5 percent at a temperature of 89.6° F. ±3.6° F. (32° C. ±2.0° C.) for 72 hours.

The remaining tests are applicable for cord sets which are compatible with outdoor use. It is noted that the insulation jackets of cord sets which are conducive to outdoor use generally are identified in the art with the suffix "W-A".

In the third test, the labels are tested with the "5 pound test" after 24 hours of exposure conditioning at 73.4° F. ±3.6° F. (23° C. ±2°) and 50±5 percent relative humidity, followed by immersion for 48 hours to a depth of not less than 0.125 inches (≈3.2 mm) in demineralized water at a temperature of 73.4° F. (23° C.).

In the fourth test, the labels are tested with the "5 pound test" after 24 hours of exposure conditioning at 73.4° F. ±3.6° F. (23.0° C. +/−2.0° C.) and 50±5 percent relative humidity, followed by 10 days of exposure in an air-circulating oven at a temperature of 140° F. (60° C.).

In the fifth test, the labels are tested with the "5 pound test" after 24 hours of exposure conditioning at 73.4° F. ±3.6° F. (23.0° C. ±2.0° C.) and 50±5 percent relative humidity, followed by 7 hours of exposure in a cold box at a temperature of 14.0° F. ±4° F. (−10° C. ±2° C.).

In the sixth test, the three labels are tested with the "5 pound test" after 24 hours of exposure conditioning at 73.4° F. ±3.6° F. (23.0° C. ±2.0° C.) and 50±5 percent relative humidity, followed by 720 hours of exposure to water and ultraviolet light. The labels are exposed to water and ultraviolet light on an apparatus which has a twin enclosed carbon-arc Type D or DH, as described in the Standard Practice for Operating Light-Exposure Apparatus (Carbon-Arc Type) With and Without Water for Exposure of Nonmetallic Materials, ASTM G 23-1992. The operating cycle is 20 minutes, with 17 minutes of light only and three minutes of water spray and light.

The labels passed the "5 pound test" noted above following conditioning under each of these tests, in accordance with the Underwriters Laboratories Incorporated Standard 817. More specifically, upon application of the "5 pound test" following exposure to each of the conditions encountered in tests 1–6, the labels did not tear beyond 0.06 inches (1.6 mm) at any point. The labels also did not separate from the cord set, and the labels did not slip or move along the length of the cord set more than 0.5 inches (13 mm). There was also no visible damage to the cord set. In addition, there was no permanent shrinkage, deformation, cracking, or any other condition that rendered the print on the labels illegible. Further, the overlamination remained in place and was not torn or otherwise damaged, with the underlying print still legible.

EXAMPLE 2

A topcoated white vinyl facestock supplied by 3M Co. of St. Paul Minn., and identified as Scotchmark 7600, is coated on its bottom surface with an aggressive, solvent-based, permanent acrylic primary adhesive, #500. The primary adhesive is in turn attached to a 43 pound kraft paper liner, in order to form a master web. The facestock comprises plasticizers, which are present in a concentration of 14–15% by weight of the facestock. In accordance with ASTM test D-882, the tensile strength and elongation of a 2 inch by 4 inch sample of facestock is tested. The tensile strength is found to be 3295 psi when measured in the machine direction, and is found to be 2537 psi when measured in the transverse direction. In addition, the elongation of the facestock is found to be 192.3% when tested in the machine direction, and is found to be 267.5% when tested in the cross direction. Further, the stiffness is tested based upon PSTC Test Method 37 and is found to be 0.27 gram-centimeters when tested in the machine direction, and is found to be 0.23 gram-centimeters when tested in the transverse direction. The thickness of the facestock prior to topcoating is about 3.8 mils.

A label is prepared as described hereinabove by applying water-based lightfast flexographic inks supplied by Arcar Graphics Inc., and identified as Arcar Phase II inks, in order to convey a cautionary message. A transparent, polypropylene overlaminate film supplied by Sekesui TA Industries, Inc., and identified as Sekesui TA 1205, is laminated onto an outermost surface of the label by an ultraviolet resistant acrylic adhesive. The label is attached to a cord set as described hereinabove.

Three labels of this type were subjected to conditioning tests 1-6, as described in EXAMPLE 1. The three labels passed each of the conditioning tests described in EXAMPLE 1, in accordance with the Underwriters Laboratories Incorporated Standard 817.

EXAMPLE 3 (COMPARATIVE EXAMPLE)

A master web comprising a topcoated semi-gloss paper facestock, combined with an aggressive, solvent-based, acrylic permanent adhesive on a kraft liner is overlaminated with a transparent polyester material to form a label as described hereinabove and in EXAMPLE 1. Three labels of this type were subjected to conditioning tests 1-6, as described in EXAMPLE 1. The labels failed at least one of the six tests described in EXAMPLE 1. In particular, the label did not possess an appropriate tensile strength. Accordingly, the label ripped more than 0.06 inches ($\approx$1.6 mm) when subjected to the "5 pound test" following saturation with water.

EXAMPLE 4 (COMPARATIVE EXAMPLE)

A topcoated white polyester is combined with a first surface of a solvent-based, acrylic permanent primary adhesive which is not suitably aggressive, that is, the primary adhesive does not have a high shear adhesion property. A master web is prepared by attaching a second surface of the primary adhesive, with the polyester disposed on the first surface of the primary adhesive, onto a kraft liner. The master web is overlaminated with a transparent polypropylene material to form a label as described hereinabove and in EXAMPLE 1. Three labels of this type were subjected to conditioning tests 1-6, as described in EXAMPLE 1. The labels failed at least one of the six tests described in EXAMPLE 1. In particular, the label slipped more than 0.5 inches ($\approx$13 mm) when subjected to the "5 pound test" because of the inadequate shear adhesion of the primary adhesive.

EXAMPLE 5 (COMPARATIVE EXAMPLE)

A label comprising a topcoated spunbounded polyolefin facestock in various thicknesses up to 10 mils ($\approx$0.0256 cm) and an aggressive, acrylic permanent adhesive is prepared on a kraft liner, without the presence of an overlying overlaminate film. Three labels of this type were subjected to conditioning tests 1-6, as described in EXAMPLE 1. The labels failed at least one of the six tests described in EXAMPLE 1. In particular, the label was unable to withstand ultraviolet-light. Accordingly, the label ripped more than 0.06 inches ($\approx$1.6 mm) when subjected to the "5 pound test".

EXAMPLE 6 (COMPARATIVE EXAMPLE)

A label comprising a topcoated polyester with an adhesive which is not suitably aggressive, that is, with an insufficient shear adhesion property, is prepared on a kraft liner, without the presence of an overlaminate film. Three labels of this type were subjected to conditioning tests 1-6, as described in EXAMPLE 1. The labels failed at least one of the six tests outlined in EXAMPLE 1. In particular, the label slipped more than 0.5 inches ($\approx$13 mm) when subjected to the "5 pound test" because of the inadequate shear adhesion of the primary adhesive.

EXAMPLE 7 (COMPARATIVE EXAMPLE)

A label comprising a topcoated flexible white vinyl, as described in EXAMPLE 2, with an adhesive which is not suitably aggressive, as defined in EXAMPLES 4 and 6, is prepared on a kraft liner, without the presence of overlamination. Three labels of this type were subjected to conditioning tests 1-6, as described in EXAMPLE 1. The labels failed at least one of the six tests outlined in EXAMPLE 1. In particular, the label slipped more than 0.5 inches ($\approx$13 mm) when subjected to the "5 pound test" because of the inadequate shear adhesion of the primary adhesive.

EXAMPLE 8 (COMPARATIVE EXAMPLE)

A label comprising a white vinyl without topcoating and an adhesive which is not suitably aggressive, as defined in EXAMPLES 4 and 6, is prepared on a kraft paper liner, without the presence of an overlying overlaminate film. Three labels of this type were subjected to conditioning tests 1-6, as described in EXAMPLE 1. The labels failed at least one of the six tests outlined in EXAMPLE 1. In particular, the label did not resist abrasion. The lack of a topcoat also prevented the ink from remaining legible.

A summary of the representative and comparative examples is provided in Table 1 below.

TABLE 1

| Example | Does the primary adhesive have a high shear property? | Type of Facestock | Is an Overlaminate included? | Does the label satisfy conditioning tests 1–6 under UL Standard 817? |
| --- | --- | --- | --- | --- |
| 1 | Yes | A vinyl | Yes | Yes |
| 2 | Yes | A vinyl | Yes | Yes |
| 3 | Yes | A semi-gloss paper | Yes | No |
| 4 | No | A polyester | Yes | No |
| 5 | Yes | A spun-bounded polyolefin | No | No |
| 6 | No | A polyester | No | No |
| 7–8 | No | A vinyl | No | No |

While the preferred embodiment of the invention has been disclosed, it should be appreciated that the invention is susceptible of modification without departing from the spirit of the invention or the scope of the subjoined claims. For example, it is noted that the advantages and benefits of the labels of the present invention may also be applicable for use with other objects. In particular, the labels of the present invention may be attached to elongated objects wherein the surface area of the label exceeds the circumference of the elongated object, so that the label may be wrapped around the elongated object in order to attach the label to the object. The labels of the present invention are often particularly suited for objects which are subjected to extensive outdoor use and therefore must be able to withstand significant "wear and tear" as noted hereinabove.

We claim:

1. An adhesive label for attaching to an elongated object having an outer substantially circumferential surface, the label comprising:

a facestock having a high tensile strength, the facestock having top and bottom surfaces dimensioned to provide a surface area which exceeds said substantially circumferential outer surface of said object;

at least one ink disposed on at least a portion of the top surface of the facestock; and a pressure-sensitive, permanent primary adhesive having a high shear adhesion property, the primary adhesive having a top surface which is provided on the bottom surface of the facestock and a bottom surface comprising a substantially central portion separating a pair of peripheral portions, the substantially central portion being dimensioned to contact at least a portion of said outer substantially circumferential surface of said elongated object, and the pair of peripheral portions being dimensioned to be conjoined together to cause a portion of the label to extend outwardly from said elongated object.

2. A label as defined in claim 1, further comprising:

a transparent overlaminate film overlying the printed top surface of the facestock; and a transparent, ultraviolet-light resistant overlaminate adhesive attaching the overlaminate film onto the printed top surface of the facestock.

3. A label as defined in claim 1, further comprising a carrier liner attached to a bottom surface of the primary adhesive, wherein the carrier liner may be removed prior to attachment of the label to the elongated object.

4. A label as defined in claim 3, wherein the carrier liner further comprises a release coating which facilitates separation of the liner from the primary adhesive.

5. A label as defined in claim 3, wherein the carrier liner comprises a kraft paper liner.

6. A label as defined in claim 1 wherein the primary adhesive is a solvent-based acrylic adhesive.

7. A label as defined in claim 2, wherein the transparent overlaminate film is formed substantially of polypropylene.

8. A label as defined in claim 1, wherein the printed matter is provided by at least one flexographic, lightfast water-based ink.

9. A label as defined in claim 1, wherein the facestock is provided with plasticizers.

10. A label as defined in claim 1, wherein the elongated object is an electrical cord set having an outer surface which is substantially formed of a material having a low surface energy.

11. A label as defined in claim 1, wherein at least a portion of the facestock comprises at least one material containing a vinyl group.

12. A label as defined in claim 1, wherein at least a portion of the facestock is selected from at least one of the following materials: polyvinyl chloride, vinyl acetate, ethylene vinyl acetate, polyvinyl fluoride, vinyldiene chloride copolymer, and vinyl chloride acetate copolymer.

13. A label as defined in claim 1, wherein the facestock has a stiffness ranging from about 0.18 gram-centimeters to about 1.75 gram-centimeters when tested in a machine direction.

14. A label as defined in claim 1, wherein the facestock has a tensile strength exceeding about 2200 pounds per square inch, as tested in a transverse direction.

15. A label as defined in claim 1, wherein the facestock has a tensile strength exceeding about 3000 pounds per square inch, as tested in a machine direction.

16. A label as defined in claim 1, wherein the high shear adhesion of the primary adhesive is defined as requiring at least approximately 15 hours for the primary adhesive to slip from a 50 micron polyester film having a surface area of one square inch (6.45 square centimeters) by a force of 700N/m$^2$ at 21° C. ($\approx$70° F.) wherein the adhesive is provided in a thickness of 25 microns ($\approx$1 mil).

17. A label as defined in claim 1, wherein the high shear adhesion of the primary adhesive is defined as requiring at least 20 minutes for a 1 inch by 0.5 inch sample of adhesive to slip from a stainless steel panel by a weight of 1000 grams.

18. An adhesive label as defined in claim 1 wherein the facestock further elongates to at least about 120% of the initial length of the facestock when tested in a machine direction and elongates to about 125% of the initial length of the facestock when tested in a transverse direction.

19. An adhesive label for attaching to an electrical cord set, the label dimensioned to provide a surface area which exceeds a circumference of the cord set, the label comprising:

a facestock having a tensile strength of at least 3000 pounds per square inch when measured in a machine direction, the facestock having top and bottom surfaces, the facestock provided with plasticizers, the top surface having an ink-receptive topcoat thereon;

at least one lightfast, flexographic ink constituting printed matter on the topcoated top surface of the facestock;

a transparent polypropylene overlaminate film overlying the printed topcoated upper surface of the facestock;

a transparent, ultraviolet-light resistant overlaminate adhesive attaching the overlaminate film onto the printed topcoated top surface of the facestock;

a pressure-sensitive, solvent-based, acrylic permanent primary adhesive having a shear adhesion which requires at least approximately 15 hours for the primary adhesive to slip from a polyester film having a surface area of 1 inch$^2$ (6.45 cm$^2$) by a force of 700N/m$^2$ at 21° C. ($\approx$70° F.) wherein the adhesive is provided in a thickness of 25 microns ($\approx$1 mil), the primary adhesive having a bottom surface and a top surface which is attached to the bottom surface of the facestock; and a carrier liner attached to the bottom surface of the primary adhesive, wherein the carrier liner is removable so as to be capable of exposing the bottom surface of the primary adhesive, wherein the bottom surface of the primary adhesive may be applied to an outer surface of the cord set so as to securely attach the label to the cord set.

20. An adhesive label as defined in claim 1 wherein the top surface of the facestock includes a topcoat.

21. An adhesive label for attaching to an elongated object, the label comprising:

a facestock having a high tensile strength, the facestock having top and bottom surfaces dimensioned to provide a surface area which exceeds a circumference of said object;

at least one ink disposed on at least a portion of the top surface of the facestock; and a pressure-sensitive, permanent primary adhesive having a high shear adhesion property, the primary adhesive having a top surface which is provided on the bottom surface of the facestock and a bottom surface comprising a central portion separating two peripheral portions, wherein the label, when wrapped about the circumference of the elongated object, has the substantially central portion of the permanent adhesive in surface contact with an outer surface of said elongated object, and peripheral label portions extending outwardly from said object and joined together by the primary adhesive so as to securely fasten the label to said elongated object.

* * * * *

US005658648C1

(12) EX PARTE REEXAMINATION CERTIFICATE (5579th)
United States Patent
Doerr et al.

(10) Number: US 5,658,648 C1
(45) Certificate Issued: Oct. 24, 2006

(54) LABELS FOR ELECTRICAL CORD SETS

(75) Inventors: Christopher Eugene Doerr, Indianapolis, IN (US); Daniel Richard Ray, Algoma, WI (US); Jodi Leigh Swoboda, Algoma, WI (US)

(73) Assignee: Wisconsin Label Corporation, Algoma, WI (US)

Reexamination Request:
No. 90/006,394, Sep. 30, 2002

Reexamination Certificate for:
Patent No.: 5,658,648
Issued: Aug. 19, 1997
Appl. No.: 08/518,195
Filed: Aug. 23, 1995

(51) Int. Cl.
*B32B 3/00* (2006.01)

(52) U.S. Cl. .............. 428/195.1; 428/204; 428/212; 428/411.1; 428/488.41; 428/500; 428/515

(58) Field of Classification Search .............. 428/195.1, 428/204, 212, 411.1, 488.41, 500, 515
See application file for complete search history.

(56) References Cited

U.S. PATENT DOCUMENTS

| | | | | |
|---|---|---|---|---|
| 4,172,163 A | 10/1979 | Magnotta | ...................... | 428/40 |
| 4,784,714 A | 11/1988 | Shibata | ........................ | 156/354 |
| 4,842,646 A | 6/1989 | Gamblin | ........................ | 106/22 |
| 5,186,782 A | 2/1993 | Freedman | .............. | 156/244.11 |
| 5,201,976 A | 4/1993 | Eastin | ........................ | 156/152 |
| 5,262,216 A | 11/1993 | Popat et al. | ................... | 428/42 |
| 5,273,798 A | 12/1993 | Miner | ......................... | 428/40 |
| 5,284,688 A | 2/1994 | Hiatt | ............................ | 428/40 |
| 5,336,541 A | 8/1994 | Kobayashi | ................... | 428/40 |
| 5,358,281 A | 10/1994 | Grieg | ............................ | 283/81 |
| 5,374,130 A | 12/1994 | Hirono | ........................ | 400/68 |

OTHER PUBLICATIONS

Advertisement for Adhesive Label manufactured by Chian Yih Harng Co., Ltd. Mar. 1994.
United Laboratories Standard No. 817, "Cord Sets and Power–Supply Cords," § 99, Jan. 1994, pp. 1–4.

*Primary Examiner*—Bruce Hess

(57) ABSTRACT

Pressure-sensitive adhesive labels are disclosed, as might be particularly useful for application with electrical cord sets. The label is utilized to provide long-term, cautionary information regarding the dangers associated with electrical cord sets. The surface area of the label exceeds the circumference of the cord set, thereby allowing the label to wrap about the circumference of the cord set and adhere to itself, while also securely attaching to the cord set. The label comprises a primary adhesive which features a high shear adhesion property. A paper liner is removed from the primary adhesive prior to application to the cord set. The primary adhesive is provided on a bottom surface of a facestock, which has a high tensile strength and is preferably formed substantially from a vinyl material. Preferably, the facestock is provided with plasticizers and is topcoated. Printing ink displays a cautionary message on the topcoated upper surface of the facestock. A transparent overlaminate film, preferably formed from polypropylene, overlies the printed facestock. The overlaminate film is attached to the uppermost surface of the label by a transparent overlaminate adhesive. The labels of the present invention are able to withstand various harsh environmental conditions, and are therefore able to resist "wear and tear" which is encountered, often even upon outdoor use.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–21 is confirmed.

New claims 22–45 are added and determined to be patentable.

22. *An adhesive label for attachment to an electrical cord set, the label comprising:*
   *a facestock having a high tensile strength, the facestock having top and bottom surfaces and being dimensioned to provide a surface area which exceeds a circumference of said electrical cord set, the facestock comprising a central portion separating two peripheral portions;*
   *indicia disposed on at least a portion of the top surface of the facestock; and*
   *a pressure-sensitive, permanent adhesive having a high shear adhesion property, the adhesive being disposed on the bottom surface of the facestock, wherein the label, when wrapped about the electrical cord set, has the adhesive located on the central portion of the facestock in substantial surface contact with an outer surface of the electrical cord set, thereby securely fastening the label to said electrical cord set, with the peripheral portions of the facestock extending outwardly from the electrical cord set and the bottom surfaces of the peripheral portions of the facestock joined together by the adhesive.*

23. *An adhesive label as defined in claim 22, additionally comprising:*
   *a transparent overlaminate film overlying the top surface of the facestock having the indicia disposed thereupon; and*
   *a transparent overlaminate adhesive attaching the transparent overlaminate film onto the top surface of the facestock having the indicia disposed thereupon.*

24. *An adhesive label as defined in claim 23, wherein the transparent overlaminate adhesive is ultraviolet-light resistant.*

25. *An adhesive label as defined in claim 23, the transparent overlaminate film is formed substantially of polypropylene.*

26. *An adhesive label as defined in claim 22, additionally comprising:*
   *a carrier liner attached to the bottom surface of the facestock over the adhesive, wherein the carrier liner may be removed to expose the adhesive prior to fastening the label to the electrical cord set.*

27. *An adhesive label as defined in claim 26, wherein the carrier liner comprises:*
   *a release coating which facilitates separation of the carrier liner from the adhesive on the bottom surface of the facestock.*

28. *An adhesive label as defined in claim 26, wherein the carrier liner comprises:*
   *a kraft paper liner.*

29. *An adhesive label as defined in claim 22, wherein the adhesive comprises:*
   *a solvent-based acrylic adhesive.*

30. *An adhesive label as defined in claim 22, wherein the indicia comprises at least one ink disposed on at least a portion of the top surface of the facestock.*

31. *An adhesive label as defined in claim 30, wherein the ink comprises:*
   *at least one flexographic, lightfast water-based ink.*

32. *An adhesive label as defined in claim 30, wherein the indicia comprises:*
   *cautionary information regarding the dangers associated with electrical cord sets.*

33. *An adhesive label as defined in claim 22, wherein the facestock is provided with plasticizers.*

34. *An adhesive label as defined in claim 22, wherein the electrical cord set has an outer surface which is substantially formed of a material having a low surface energy.*

35. *An adhesive label as defined in claim 22, wherein at least a portion of the facestock comprises:*
   *at least one material containing a vinyl group.*

36. *An adhesive label as defined in claim 22, wherein at least a portion of the facestock is selected from at least one of the following materials:*
   *polyvinyl chloride, vinyl acetate, ethylene vinyl acetate, polyvinyl fluoride, vinyldiene chloride copolymer, and vinyl chloride acetate copolymer.*

37. *An adhesive label as defined in claim 22, wherein the facestock has a stiffness ranging from about 0.18 gram-centimeters to about 1.75 gram-centimeters when tested in a machine direction.*

38. *An adhesive label as defined in claim 22, wherein the facestock has a tensile strength exceeding about 2200 pounds per square inch, as tested in a transverse direction.*

39. *An adhesive label as defined in claim 22, wherein the facestock has a tensile strength exceeding about 3000 pounds per square inch, as tested in a machine direction.*

40. *An adhesive label as defined in claim 22, wherein the high shear adhesion of the primary adhesive is defined as requiring at least approximately 15 hours for the primary adhesive to slip from a 50 micron polyester film having a surface area of one square inch (6.45 square centimeters) by a force of $700N/m^2$ at $21°$ C. ($\approx 70°$ F.) wherein the adhesive is provided in a thickness of 25 microns ($\approx 1$ mil).*

41. *An adhesive label as defined in claim 22, wherein the high shear adhesion of the primary adhesive is defined as requiring at least 20 minutes for a 1 inch by 0.5 inch sample of adhesive to slip from a stainless steel panel by a weight of 1000 grams.*

42. *An adhesive label as defined in claim 22, wherein the facestock further elongates to at least about 120% of the initial length of the facestock when tested in a machine direction and elongates to about 125% of the initial length of the facestock when tested in a transverse direction.*

43. *An adhesive label as defined in claim 22, wherein the top surface of the facestock has an ink-receptive topcoat disposed thereupon.*

44. *An adhesive label for attachment to an electrical cord set, the label comprising:*
   *a facestock having a high tensile strength, the facestock having top and bottom surfaces and being dimensioned to provide a surface area which exceeds a circumference of said electrical cord set, the facestock comprising a central portion separating two peripheral portions;* cautionary information regarding the dangers associated with electrical cord sets printed on at least a portion of the top surface of the facestock;

a transparent overlaminate film secured to the top surface of the facestock having the cautionary information printed thereupon;

a pressure-sensitive, permanent adhesive having a high shear adhesion property, the adhesive being disposed on the bottom surface of the facestock; and a carrier liner attached to the bottom surface of the facestock over the adhesive, wherein the carrier liner may be removed to expose the adhesive prior to fastening the label to the electrical cord set, and wherein the label, when wrapped about the electrical cord set, has the adhesive located on the central portion of the facestock in substantial surface contact with an outer surface of the electrical cord set, thereby securely fastening the label to said electrical cord set, with the peripheral portions of the facestock extending outwardly from the electrical cord set and the bottom surfaces of the peripheral portions of the facestock joined together by the adhesive.

45. An adhesive label for attachment to an electrical cord set, the label comprising:

a facestock having a high tensile strength, the facestock having top and bottom surfaces and being dimensioned to provide a surface area which exceeds a circumference of said electrical cord set, the facestock comprising a central portion separating two peripheral portions;

cautionary information regarding the dangers associated with electrical cord sets printed on at least a portion of the top surface of the facestock;

a transparent protective layer secured to the top surface of the facestock having the cautionary information printed thereupon; and a pressure-sensitive, permanent adhesive having a high shear adhesion property, the adhesive being disposed on the bottom surface of the facestock, wherein the label, when wrapped about the electrical cord set, has the adhesive located on the central portion of the facestock in substantial surface contact with an outer surface of the electrical cord set, thereby securely fastening the label to said electrical cord set, with the peripheral portions of the facestock extending outwardly from the electrical cord set and the bottom surfaces of the peripheral portions of the facestock joined together by the adhesive.

* * * * *